(12) United States Patent
Asta

(10) Patent No.: US 10,092,151 B2
(45) Date of Patent: Oct. 9, 2018

(54) VACUUM HOSE COVER

(71) Applicant: F2M International Inc., Woodbridge (CA)

(72) Inventor: Aldredo Asta, Woodbridge (CA)

(73) Assignee: F2M International Inc., Woodbridge (CA)

( * ) Notice: Subject to any disclaimer, the term of this patent is extended or adjusted under 35 U.S.C. 154(b) by 0 days.

(21) Appl. No.: 15/424,020

(22) Filed: Feb. 3, 2017

(65) Prior Publication Data
US 2018/0070786 A1  Mar. 15, 2018

Related U.S. Application Data

(60) Provisional application No. 62/395,038, filed on Sep. 15, 2016.

(51) Int. Cl.
| | | |
|---|---|---|
| *F16L 57/00* | (2006.01) | |
| *A47L 9/24* | (2006.01) | |
| *A44B 19/24* | (2006.01) | |
| *F16L 11/15* | (2006.01) | |

(52) U.S. Cl.
CPC ............ *A47L 9/248* (2013.01); *A44B 19/24* (2013.01); *F16L 11/15* (2013.01)

(58) Field of Classification Search
CPC ... A47L 9/24; A47L 9/248; A47L 9/12; A47L 9/14; F16L 57/00; F16L 57/06
USPC ............... 138/110, 158, 108, 161, 120, 167; 15/325, 246.2, 339
See application file for complete search history.

(56) References Cited

U.S. PATENT DOCUMENTS

| | | | | |
|---|---|---|---|---|
| 3,491,800 A * | 1/1970 | Holton | ...................... | E21F 1/04 138/120 |
| 5,095,576 A * | 3/1992 | Galigan | ................... | A47L 9/248 15/246.2 |
| 5,535,787 A * | 7/1996 | Howell | ................. | H02G 3/0487 138/110 |
| 5,933,914 A * | 8/1999 | Beane | ....................... | A47L 9/12 138/110 |
| 6,102,076 A * | 8/2000 | Romero, Jr. | .......... | F01N 13/085 138/110 |
| 6,983,767 B2 * | 1/2006 | Rickards | .................. | F16L 57/00 138/104 |
| 9,675,843 B2 * | 6/2017 | Petty | ..................... | A63B 29/028 |
| 2006/0249212 A1 * | 11/2006 | Kressierer/Huber | ....................... | A61M 16/0875 138/33 |

* cited by examiner

*Primary Examiner* — Patrick F Brinson
(74) *Attorney, Agent, or Firm* — Ridout and Maybee LLP

(57) ABSTRACT

A hose cover having a tubular quilted sleeve having a first end, a second end and a slit along the length of the tubular quilted sleeve. A first tubular knitted sleeve coupled to the first end of the tubular quilted sleeve. A second tubular knitted sleeve coupled to the second end of the tubular quilted sleeve. A zipper coupled to edges of the tubular quilted sleeve defining the slit, the zipper moveable from a first open position to a second closed position for closing the slit. Also, disclosed is a method of installing the hose cover on a hose and a kit containing the hose cover.

6 Claims, 3 Drawing Sheets

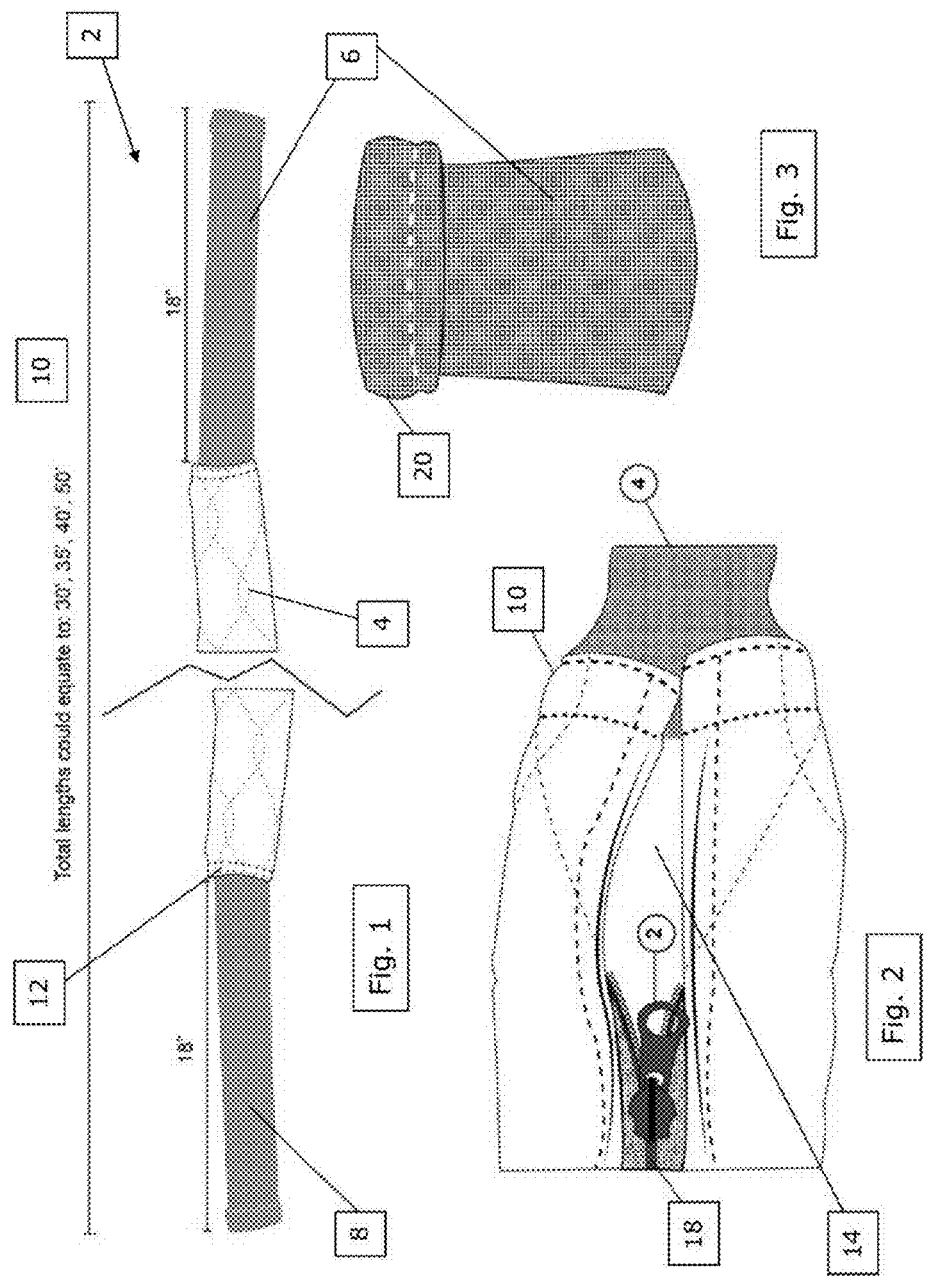

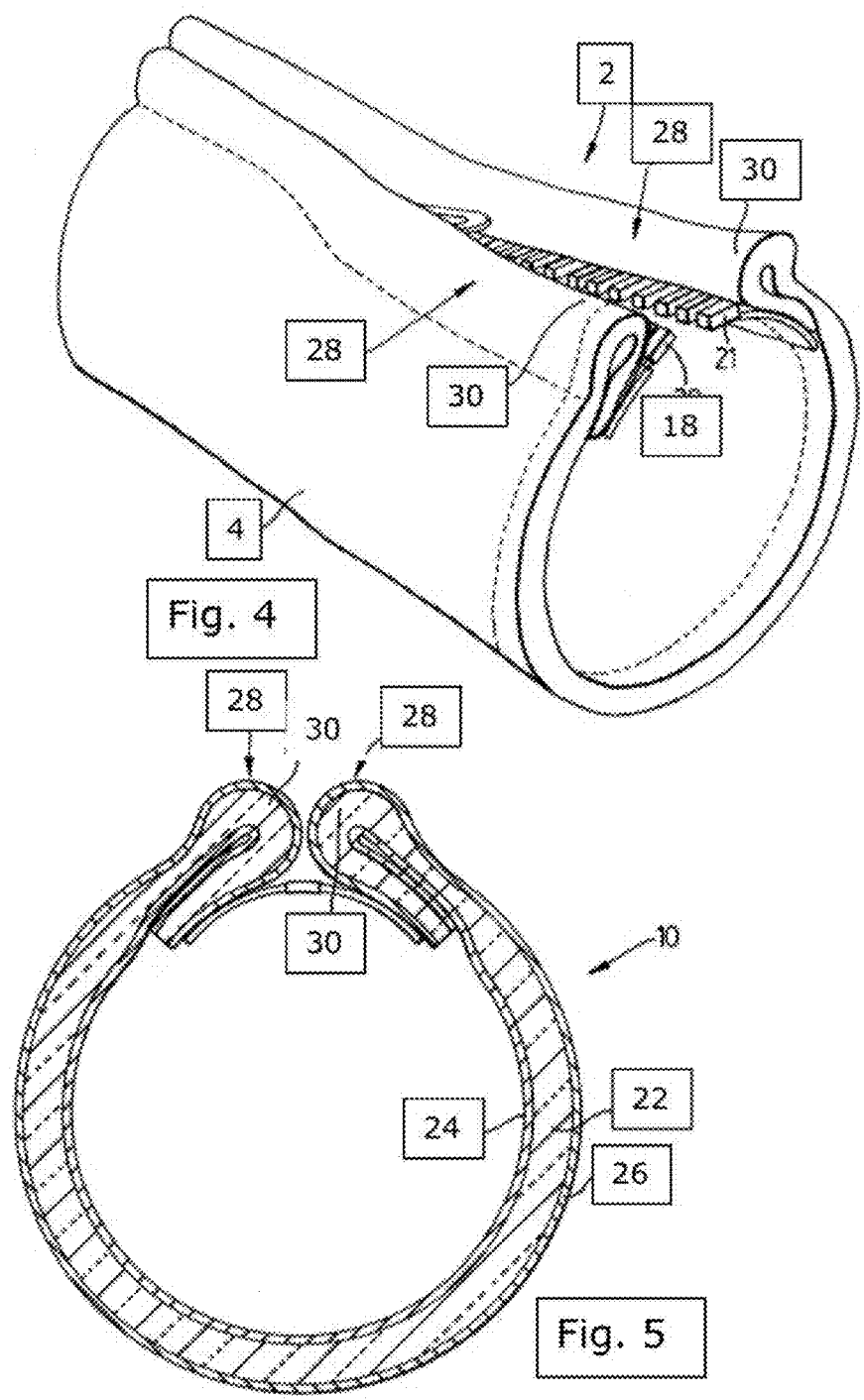

VACUUM HOSE COVER

CROSS-REFERENCE TO RELATED APPLICATIONS

The present application claims the benefit of U.S. Provisional Application Ser. No. 62/395,038, filed on Sep. 15, 2016, titled VACUUM HOSE COVER, the disclosure of which is incorporated herein by reference in its entirety.

FIELD

The specification relates to a cover for a vacuum hose.

BACKGROUND

A hose for a central vacuum system is typically made of plastic and is about 30 feet long. In order to impart strength and flexibility to the hose, it is corrugated, and it is these corrugations in the hose that can scratch and abrade furniture or other surfaces. The corrugation and flexibility of the hose also allows the hose to stretch. One solution to this problem has been to cover the vacuum hose with a sleeve made of a non-abrasive material such as a fabric. A sleeve of this type is disclosed in U.S. Pat. No. 5,095,576 dated Mar. 17, 1992. While effective, sleeve type hose covers have several disadvantages associated with their use. The hose must be threaded through the sleeve, and for the purpose of covering a 30 foot hose, the treading operation is awkward and tedious at best. Because vacuum hoses have metal fittings on each end for attachment purposes, the sleeve must have a circumference sufficient to readily slip over the end fittings. This requirement in turn means that the sleeve is circumferentially oversize in relation to its fit about the corrugated hose itself. Accordingly, prior art sleeve type covers need to have means at each end of the sleeve to secure it to the hose, otherwise there is a tendency for the sleeve to slip partly off an end of the hose particularly when the hose is unattached. As the hose cover itself will become soiled with use over time, it is desirable to be able to easily remove and reinstall the cover so that it may be washed when it becomes soiled. Clearly, the sleeve type hose cover does not lend itself to easy installation and removal.

Another sleeve of this type is disclosed in Canadian patent 2,195,275 dated Oct. 6, 1998. While this effective sleeve type makes installing and removing easy it fails in the general use of the covered hose. Because the hose stretches and the quilted material doesn't, while in use the quilted material hose cover slides (creeps) down the hose and leaves some portion of corrugated hose exposed. In addition, the manufacturers of the various hoses in the market have different tolerances from +/−6" to +/−12". This causes the above-type of hose cover to have bunching of excess hose cover martial to storage of hose cover material leaving some corrugated hose exposed.

There is a need in the art for a vacuum hose cover that can help to address some of the challenges noted above.

BRIEF DESCRIPTION OF THE DRAWINGS

Reference will now be made, by way of example, to the accompanying drawings which show example embodiments of the present application, and in which:

FIG. 1 is a plan view of an embodiment in accordance with the specification;

FIG. 2 is a sectional view of an embodiment shown in FIG. 1 in accordance with the specification;

FIG. 3 is a sectional view of an embodiment shown in FIG. 1 in accordance with the specification;

FIG. 4 is a perspective view of an embodiment in accordance with the specification having a zippered closure;

FIG. 5 is a cross sectional view of the device shown in FIG. 4; and

Similar reference numerals may have been used in different figures to denote similar components.

DESCRIPTION OF EXAMPLE EMBODIMENTS

Figure 6:
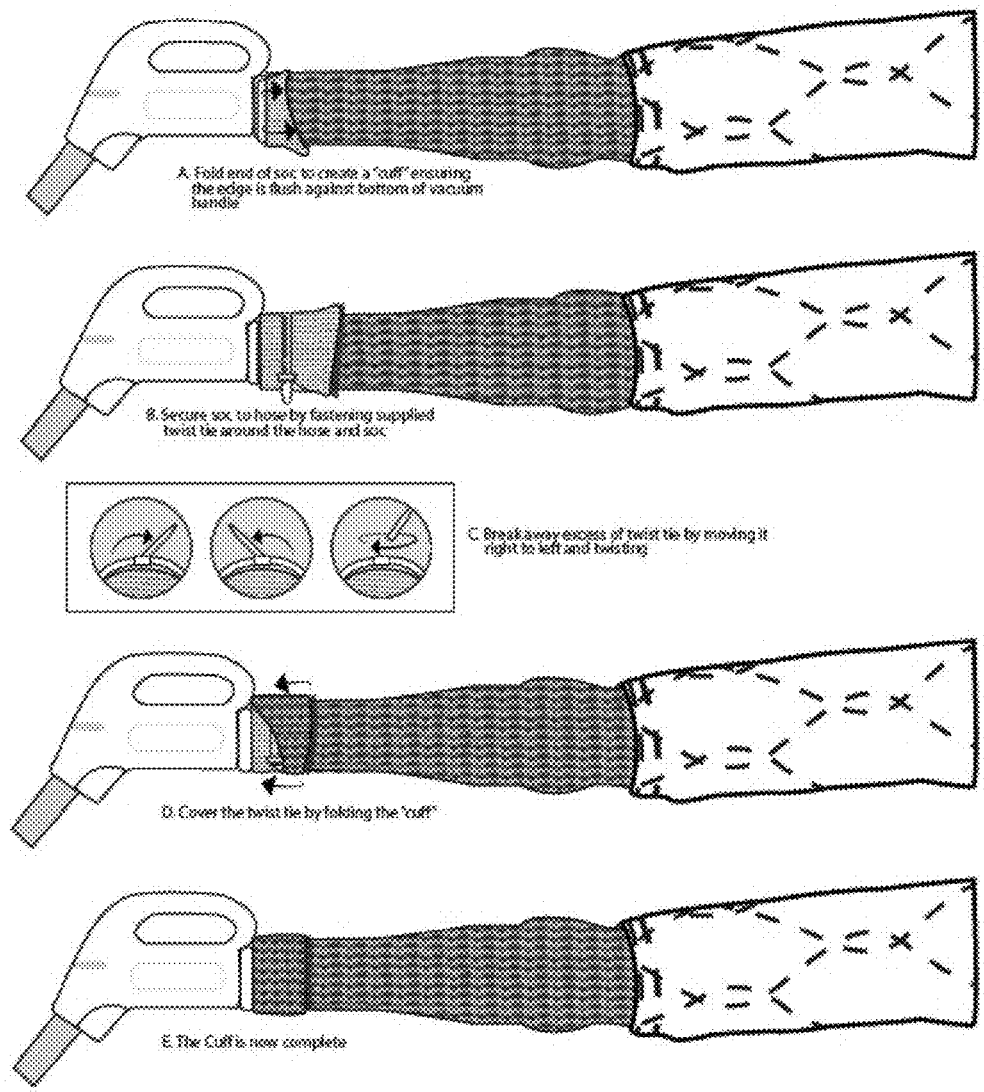
FIG. 6 shows a steps for securing the terminal ends of the knitted sleeve.

The specification can help to address some of the various problems and shortcomings of prior art hose sleeves by providing two different fabric constructions. The fabric cover for a vacuum hose, contains an elongate rectangular piece of fabric having a width approximately corresponding to the circumference of the hose and having parallel longitudinal edges and tubular knitted fabric at each end. The cover is then fastened at each end using nylon ties, using the fastening means of a zipper for major of the length of hose (28' of 30' length) and using the 18" of tubular knitted fabric on each end makes for better initial securing and because the knitted fabric is oversized and fold allows for custom fitted length that can adjust to various manufacturers tolerance levels. In addition, the knitted tubular fabric's stretch ability to stretch with hose, avoids slippage and hose cover to creep down hose. Combining the two fabric construction and using the fastening method solves the major flaws in prior inventions.

FIG. 1 discloses an embodiment of a hose cover (2) in accordance with the specification. The hose cover (2) is made of a tubular quilted sleeve (4), which can be formed as described below, and knitted sleeves (6, 8). The tubular quilted sleeve (4) has ends, described herein as a first end (10) and a second end (12) of the tubular quilted sleeve (4). A first knitted sleeve (6) is connected to the first end (10) of the tubular quilted sleeve (4) and a second knitted sleeve (8) is connected to the second end (12) of the tubular sleeve (4). The method of connecting the first and second knitted sleeves (6, 8) to the first and second ends (10, 12) of the tubular quilted sleeve (4) is not particularly limited and should be known to a person of ordinary skill in the art. In one embodiment, for example and without limitation and as shown in the figures, the first and second knitted sleeves (6, 8) are knitted to the first and second ends (10, 12) of the tubular quilted sleeve (4).

The tubular quilted sleeve (4) also has a slit (14) (as shown in FIG. 2) that allows for insertion of the hose (16) into the hose cover (2). In one embodiment, as shown in herein, the slit can run nearly the entire length of the tubular quilted sleeve (4), i.e., from near the first end (10) to the second end (12) of the tubular quilted sleeve (4).

The edge of the tubular quilted sleeve (4) defining the slit (14) is provided with a fastening means that allows the slit (14) to be closed when the hose (16) has been inserted into the hose cover (2) or while during storage. In a particular embodiment as shown in the Figures, the fastening means is a zipper (18). When the zipper (18) is in a first position, the slit (14) is open and allows for a hose (16) to be inserted, while in a closed (second) position, the slit (14) is closed and can retain the hose (16) inside the hose cover (2).

The knitted sleeves (6, 8) used in accordance with the specification is not particularly limited and should be known to a person of ordinary skill in the art. The knitted sleeves (6, 8) can snuggly fit the hose (16) and can help avoid slippage of the knitted sleeves (6, 8) from the hose (16). The knitted sleeves (6, 8) have an open terminal end (20) (FIG. 3) that is positioned away from the ends of the tubular quilted sleeve (10, 12), from where the hose (16) can be pushed out and used by a user. While the other end of the knitted sleeves (6, 8) are coupled, such as by stitching, to the ends of the tubular quilted sleeves (10, 12), as shown in FIG. 2.

The vacuum hose cover (2) in accordance with the specification may be made of any suitable non-abrasive fabric. For the quilted sleeve (4), it has been found that quilted fabrics having a thin layer of cushioning material (22) sandwiched between inner and outer pieces (24) and (26) of a woven fabric are particularly well suited for use. The quilted sleeve (4) can be formed by an elongate rectangular piece having a length corresponding to slightly shorter (1 to 4 feet shorter, or values in between) than the length of corrugated hose (16) to be covered. In addition, the fabric for forming the quilted sleeve (4) has two parallel elongate edges (28) and (30) defining a width for the rectangular piece approximate to the circumference of the corrugated hose. Thus, when the quilted sleeve (4) is formed, it can wrap the hose and provide it with a snug, but not tight fit. To form the quilted sleeve (4), the fabric can be rolled to bring the elongate edges (28) close to one another, and then a portion of the elongate edge (28) at the ends (10, 12) of the fabric can be sewn or affixed by means that should be known to a person of ordinary skill in the art, to form the quilted sleeve (4).

The longitudinal edges (28) of the quilted sleeve (4) are provided with fastening means which cooperate to provide a releasable securement of the quilted sleeve (4) about the corrugated hose (16). As shown in FIGS. 4 and 5, a preferred fastening means is a zipper (18), but other suitable fasteners will be apparent to the skilled person and are within the scope of the invention.

By providing the quilted sleeve (4) with the longitudinal releasable fastening means (18), it can readily be attached to and removed from the hose. In the case of a zipper (18) fastener, the hose is placed on top of the unfastened quilted sleeve (4) and the quilted sleeve (4) is snuggly secured about the hose by simply zipping it up. In one embodiment, the zipper or other fastening means (18) should avoid scratching or abrading surfaces along while the hose is moved, so the fastening means (18) is attached along each edge (28) so that there is a fabric edge portion (30) which covers the fastening means (18). In another embodiment, each portion of the edge material forms a longitudinal bead (30) along each edge (28). The abutting edge beads (30) efficiently cover the fastening means (18) when the quilted sleeve (4) is secured about the hose (FIG. 4), thereby providing a completely non-abrasive covering of the corrugated hose.

From the foregoing, it will be appreciated that the shortcomings of prior sleeve type covers can be addressed by the teaching of the specification. The hose cover (2) may be quickly and easily attached or removed so that washing a soiled cover is facilitated. The hose cover (2) may be provided in a variety of lengths to fit hoses of various sizes; however, the standard length for the hose cover (2) is approximately 30 feet.

FIG. 6 shows how the terminal ends (20) of the hose cover (2) can be secured to a hose (16). Once the hose (16) is inserted into the open slit (14) and pushed out from the terminal end (20) of the hose cover (2), the terminal ends (20) can be folded back to create a cuff (32). Fastening means, such as a twist tie (34) can be used to fasten the cuff (32) to the hose (16). The terminal ends (20) of the hose cover (2) can be folded back again to cover the twist tie (34) to form the final cuff, which covers the twist tie (34).

Certain adaptations and modifications of the described embodiments can be made. Therefore, the above discussed embodiments are considered to be illustrative and not restrictive.

| PARTS LIST | |
|---|---|
| 2 | Hose cover |
| 4 | Quilted sleeve |
| 6 | First knitted sleeve |
| 8 | Second knitted sleeve |
| 10 | First end of the tubular quilted sleeve |
| 12 | Second end of the tubular quilted sleeve |
| 14 | Slit |
| 16 | Hose |
| 18 | Zipper |
| 20 | Terminal end of knitted sleeve |
| 22 | Cushioning material |
| 24 | Inner piece of quilted sleeve |
| 26 | Outer piece of quilted sleeve |
| 28 | Elongate edge of quilted sleeve |
| 30 | Fabric edge/bead |
| 32 | Cuff |
| 34 | Twist tie |

What is claimed is:

1. A hose cover, comprising:
   a tubular quilted sleeve having a first end, a second end and a slit along the length of the tubular quilted sleeve;
   a first tubular knitted sleeve coupled to the first end of the tubular quilted sleeve;
   a second tubular knitted sleeve coupled to the second end of the tubular quilted sleeve; and
   a zipper coupled to edges of the tubular quilted sleeve defining the slit, the zipper moveable from a first open position to a second closed position for closing the slit.

2. The hose cover of claim 1, further comprising a bead along the edges of the tubular quilted sleeve defining the slit, wherein the bead on one edge abuts the bead on another edge to cover the zipper.

3. The hose cover of claim 1, wherein the quilted sleeve comprises a layer of cushioning material sandwiched between the inner and outer fabric sheets.

4. The hose cover of claim 2, wherein the quilted sleeve comprises a layer of cushioning material sandwiched between the inner and outer fabric sheets.

5. A method of installing the hose cover as defined in claim 1 on a hose, comprising:
   inserting a first end of the hose in the slit, and
   sliding the hose out from a terminal end of the first tubular knitted sleeve.

6. The method of claim 5, further comprising:
   folding the terminal end of the first tubular knitted sleeve to create a cuff;
   fastening the cuff of the first tubular knitted sleeve using a fastening means; and
   folding the terminal end of the first tubular knitted sleeve to cover the fastening means.

* * * * *